United States Patent
Meyer et al.

(10) Patent No.: US 9,552,678 B2
(45) Date of Patent: Jan. 24, 2017

(54) DISTANCE TO EMPTY ENERGY COMPENSATION

(71) Applicant: FORD GLOBAL TECHNOLOGIES, LLC, Dearborn, MI (US)

(72) Inventors: Jason Meyer, Canton, MI (US); Sangeetha Sangameswaran, Canton, MI (US); William David Treharne, Ypsilanti, MI (US); Bryan Michael Bolger, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 12 days.

(21) Appl. No.: 14/471,618

(22) Filed: Aug. 28, 2014

(65) Prior Publication Data

US 2016/0063771 A1    Mar. 3, 2016

(51) Int. Cl.
| | |
|---|---|
| *B60K 6/445* | (2007.10) |
| *G07C 5/00* | (2006.01) |
| *B60L 3/12* | (2006.01) |
| *B60L 11/14* | (2006.01) |
| *B60L 11/18* | (2006.01) |

(52) U.S. Cl.
CPC ............. *G07C 5/004* (2013.01); *B60L 3/12* (2013.01); *B60L 11/14* (2013.01); *B60L 11/1803* (2013.01); *B60L 2240/36* (2013.01); *B60L 2260/52* (2013.01); *B60L 2260/54* (2013.01)

(58) Field of Classification Search
CPC ...... B60K 6/445; B60K 35/00; B60L 11/1862; B60L 3/12; B60L 11/1861; G01N 33/2888; G07C 5/004

USPC ................ 701/1, 22, 123; 73/53.05
See application file for complete search history.

(56) References Cited

U.S. PATENT DOCUMENTS

| | | | | |
|---|---|---|---|---|
| 6,513,367 B2 * | 2/2003 | Bondarowicz | ..... | G01N 33/2888 324/672 |
| 2010/0250039 A1 * | 9/2010 | Bryan | ..... | B60K 6/445 701/22 |
| 2012/0143413 A1 * | 6/2012 | Cho | ..... | B60L 11/1861 701/22 |
| 2012/0179314 A1 * | 7/2012 | Gilman | ..... | B60K 35/00 701/22 |
| 2013/0073113 A1 * | 3/2013 | Wang | ..... | B60K 6/445 701/1 |
| 2013/0158758 A1 * | 6/2013 | Kim | ..... | G07C 5/004 701/22 |
| 2013/0253740 A1 | 9/2013 | Kim | | |
| 2013/0311016 A1 * | 11/2013 | Kim | ..... | B60L 11/1862 701/22 |
| 2014/0095060 A1 * | 4/2014 | Heo | ..... | B60L 11/1861 701/123 |

(Continued)

*Primary Examiner* — Yuri Kan
(74) *Attorney, Agent, or Firm* — David B. Kelley; Brooks Kushman P.C.

(57) ABSTRACT

A method of estimating distance to empty (DTE) for a vehicle includes, in response to detecting an energy loss condition expected to be present during an initial portion of a drive cycle for a period of time needed for a current temperature or pressure associated with the vehicle to achieve a steady state, outputting a DTE. The DTE is based on an amount of drive energy available and an energy loss factor associated with the energy loss condition that accounts for conversion of some of the drive energy to heat as the current temperature or pressure increases to the steady state.

17 Claims, 2 Drawing Sheets

(56) References Cited

U.S. PATENT DOCUMENTS

2015/0032318 A1* 1/2015 Gao .................. B60L 3/12
701/22

* cited by examiner

DISTANCE TO EMPTY ENERGY COMPENSATION

TECHNICAL FIELD

This patent application relates to estimating vehicle distance to empty.

BACKGROUND

Vehicles contain a certain amount of propulsive energy, in the form of chemical fuel, electrical power, or the like, that allows them to travel a certain distance. The distance that a vehicle may travel using on-board energy may be referred to as the vehicle range. The projected vehicle range based on the remaining amount of energy in a vehicle is commonly referred to as Distance to Empty (DTE). The DTE or the vehicle range may be provided for any type of vehicle including conventional vehicles, electric vehicles, hybrid vehicles, plug-in hybrid vehicles, fuel cell vehicles, pneumatic vehicles, and the like.

SUMMARY

A distance to empty (DTE) system for a vehicle includes a controller that, in response to a difference between current and expected steady state temperatures associated with the vehicle, outputs a DTE based on an amount of drive energy available and an energy loss factor that accounts for conversion of some of the drive energy to heat to raise the current temperature to the steady state temperature.

A vehicle includes at least one tire and a controller. The controller, in response to a difference between current and expected steady state pressures of the at least one tire, outputs a distance to empty based on an amount of drive energy available and an energy loss factor that accounts for conversion of some of the drive energy to heat as the current pressure of the at least one tire increases to the steady state pressure.

A method of estimating distance to empty (DTE) for a vehicle includes, in response to detecting an energy loss condition expected to be present during an initial portion of a drive cycle for a period of time needed for a current temperature or pressure associated with the vehicle to achieve a steady state, outputting a DTE based on an amount of drive energy available and an energy loss factor associated with the energy loss condition that accounts for conversion of some of the drive energy to heat as the current temperature or pressure increases to the steady state.

DETAILED DESCRIPTION

Figure 1:
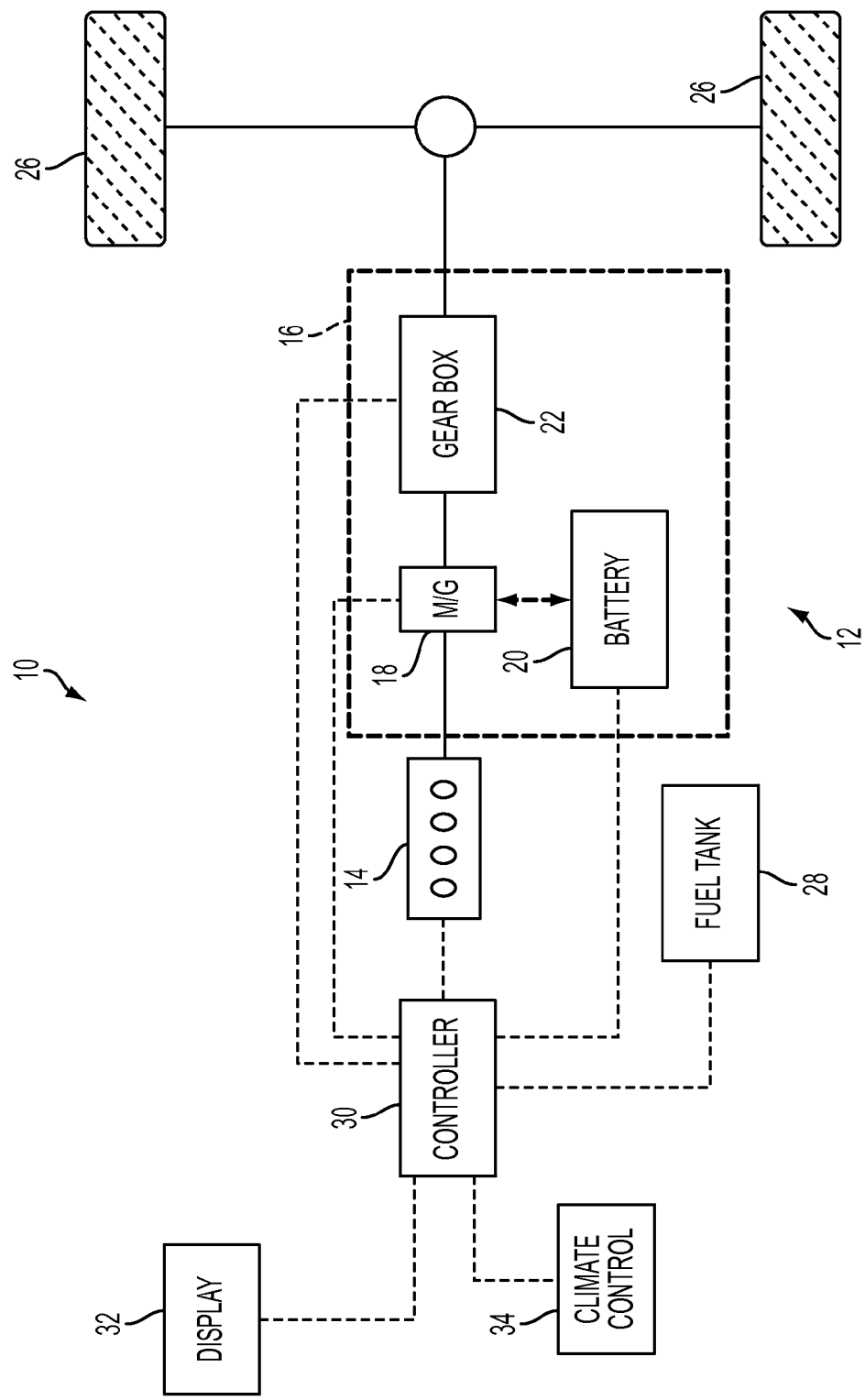
FIG. 1 is a schematic diagram of a vehicle having a distance to empty system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Accurately learning the energy consumption properties of a vehicle is important to the accuracy of DTE estimate of the vehicle. Many vehicles employ distance to empty (DTE) estimations by multiplying the learned vehicle energy consumption rates or efficiencies (for electric vehicles—km/Whr or conventional vehicles—miles per gallon) and the available energy (electric vehicles—Whr or conventional vehicles—gallons of fuel).

A challenge affecting the accuracy of the DTE estimate may be the impact of various noise factors that may vary with time. Noise factors, such as vehicle warm-up or climate control transients that may vary periodically over a short time scale compared to ambient temperature that may vary over a long time scale, impact the vehicle energy consumption rate or efficiencies temporarily.

The current approach of DTE estimation may learn the energy consumption efficiency by filtering the observed energy consumption over a fixed period of operation. By learning the energy consumption over an extended period of operation, the current approach attempts to ignore short term changes in energy consumption while slowly adapting to long term changes. In practice, short term transient changes in energy consumption can be quite significant and can cause estimated energy consumption to fluctuate between periods of under- and overcompensation and lead to inaccurate DTE estimates.

A distance to empty estimate system for a vehicle may be improved by identifying noise factors that may impact energy consumption rates over a shorter time scale. The system may identify such noise factors if the noise factors satisfy a combination of the following conditions:

1) Detectable presence of the noise factor by a vehicle sensor.
2) Predictable effect of the noise factor.
3) The noise factor affects a propulsive or non-propulsive energy consumption rate of the vehicle.
4) The noise factor has a known duration or time period upon expiry of which the noise factor may achieve a steady state condition or a condition that corresponds to a steady-state condition.

An identified noise factor that may satisfy the above mentioned conditions may include transient oil or component temperatures experienced during vehicle warm ups, transient cabin heating/cooling behavior, and a transient tire pressure or temperature.

The noise factors may be considered collectively and each factor assigned an individual weight. The weight assigned to each factor may depend on the magnitude of the impact on an energy consumption rate of the vehicle.

Compensating for noise factors may be accomplished by providing a DTE estimation architecture including a feed-forward transient energy consumption rate estimator, an energy consumption rate learning algorithm, an energy available compensator, and a DTE calculator.

Referring to FIG. 1, a schematic of a vehicle 10 is provided. The vehicle 10 may be a battery electric vehicle (BEV), conventional vehicle, or hybrid electric vehicle (HEV) including a powertrain 12 having an engine 14 that is operatively connected to a transmission 16. The transmission 16 may include an electric machine such as an electric motor-generator 18 operatively connected to an associated traction battery 20 and a gear box 22. Although the powertrain of FIG. 1 is a hybrid electric vehicle powertrain, the strategies in accordance with embodiments of the present disclosure may apply to other powertrain configurations.

The engine 14 may be selectively coupled to the motor-generator 18 via a disconnect clutch (not shown). The engine 14 and the motor-generator 18 may both act as drive sources for the vehicle 10 by providing torque to the gearbox 22 and ultimately to the vehicle wheels and tires 26. The motor-generator 18 may be implemented by any one of a plurality of types of electric machines. For example, the motor-generator 18 may be a permanent magnet synchronous motor.

The transmission 16 may be configured as a step-ratio transmission using multiple friction elements for transmission gear ratio shifting. The transmission 16 may be configured to produce multiple forward and reverse gears via multiple gearing elements within the gear box 22. Alternatively, the transmission 16 may be an electrically controlled continuously variable transmission (eCVT) which may be configured to produce an arbitrary number of gear ratios.

The controller 30 may be configured to operate the vehicle 10 or powertrain 12 in a charge depletion mode in which the engine 14 may be isolated from the remainder of the powertrain 12, via the disconnect clutch (not shown), such that the motor-generator 18 may act as the sole drive source for the vehicle 10 using the traction battery 20 as its power source. The controller 30 may also be configured to operate the vehicle 10 or powertrain 12 in a charge sustaining mode in which the engine 14 is operatively connected to the remainder of the powertrain 12, such that both the engine 14 and motor-generator 18 may act as drive sources for the vehicle 10.

While illustrated as one controller, the controller 30 may be part of a larger control system and may be controlled by various other controllers throughout the vehicle 10, such as a vehicle system controller (VSC). It may therefore be understood that the controller 30 and one or more other controllers can collectively be referred to as a "controller" that controls various actuators in response to signals from various sensors to control functions such as starting/stopping engine 14, operating motor-generator 18 to provide wheel torque or charge the traction battery 20, and providing a distance to empty estimate.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 30 may communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 30 may communicate signals to and/or from powertrain 12, the engine 14, the traction battery 20, a fuel tank 28, a display 32, and a climate control system 34. Although not explicitly illustrated, those of ordinary skill in the art will recognize various functions or components that may be controlled by the controller 30 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures, and transmission, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), motor/generator current, motor/generator voltage, and deceleration or shift mode (MDE).

In one representative example, the controller 30 may be configured to receive multiple signals via input communication channels. The signals may be indicative of an oil temperature, a component temperature, a climate control system temperature, and a tire temperature or pressure. The signals may also be indicative of energy available such as the state of charge of the traction battery 20 or the fuel available in the fuel tank 28.

The input communication channels may be further configured to monitor various vehicle temperatures that may be expected to achieve a steady state condition. The input communication channels may monitor the vehicle temperatures by receiving a signal from at least one temperature sensor. The temperature sensor may be disposed within or proximate the engine 14 and configured to monitor an component temperature such as an engine oil temperature, engine coolant temperature, combustion chamber temperature, transmission oil temperature, motor/generator temperature or battery temperature. The controller 30 may monitor the vehicle warm-up process, by receiving a transient engine temperature that is expected to reach a steady state engine operating temperature after the warm-up period. The component temperature may be classified as transient when the component temperature changes at a rate or an amount greater than a threshold engine temperature during a given time period. Alternatively, the component temperature may be deemed transient if its value is lower than a threshold. The component temperature may achieve a steady state condition if the temperature is changing at a rate or amount less than a threshold during a given time period. Alternatively the component temperature may be classified as steady-state when the value is larger than a second threshold.

The temperature sensor may alternatively be disposed proximate or within a vehicle cabin to monitor a vehicle cabin temperature. The vehicle cabin temperature may have achieved a steady state condition when the cabin temperature has stabilized proximate a target or threshold vehicle cabin temperature requested by the operator through a climate control system.

The temperature sensor may also monitor a heater core or evaporator core temperature. The heater core temperature may have achieved a steady state condition when the heater core temperature is greater than a threshold heater core temperature. This may serve as a proxy for the vehicle cabin temperature and indicate that a desired vehicle cabin heating performance has been achieved by the climate control system.

Alternatively the temperature sensor may monitor the evaporator core temperature. The evaporator core temperature may have achieved a steady state condition when the evaporator core is less than a threshold evaporator core temperature. This may serve as a proxy for the vehicle cabin temperature and indicate that a desired vehicle cooling performance has been achieved by the climate control system. Evaporator core temperature may also be used to determine if the climate control system, more specifically the air conditioning system is "preconditioned". For example, if the ambient temperature and the cabin temperature and evaporator core temperature are all 32 C and the desired cabin temperature is 18 C, the distance to empty system may estimate a high amount of energy may be required to cool the cabin down to the expected steady state temperature of 18 degrees C. However, if ambient temperature and the cabin temperature are 32 degrees C. but the evaporator core temperature is 10 degrees C., then the system would estimate that a lower amount of energy would be required to cool the cabin down to 18 C.

The amount of energy consumed or expended as the noise factor approaches a steady state condition may be determined by vehicle level characterization tests. The testing may monitor an ambient temperature and a noise factor temperature. The testing may monitor changes in the noise factor temperature at various vehicle operating points and determine the amount of energy consumed or expended by the vehicle as the noise factor approaches a steady state condition. A transfer function, algorithm, look-up table, calibrateable table or other means to relate a noise factor expected to achieve a steady state condition to the amount of energy consumed or expended, determined by the characterization testing.

The input communication channels may be further configured to receive tire characteristics such as a temperature or pressure of the tires 26. The controller 30 may monitor changes in the tire characteristics via a tire pressure monitoring system as the tires are frictionally heated during operation. The tire pressure monitoring system may include a temperature sensor and/or a tire pressure sensor. The tire temperature or pressure may have achieved a steady state condition when a difference between a current tire temperature or pressure and the transient tire temperature or pressure is less than a threshold change or amount during a given time period.

The controller 30 may also be configured to output a distance to empty estimate via output communication channels. The DTE estimate may be output for display via the display 32.

Figure 2:
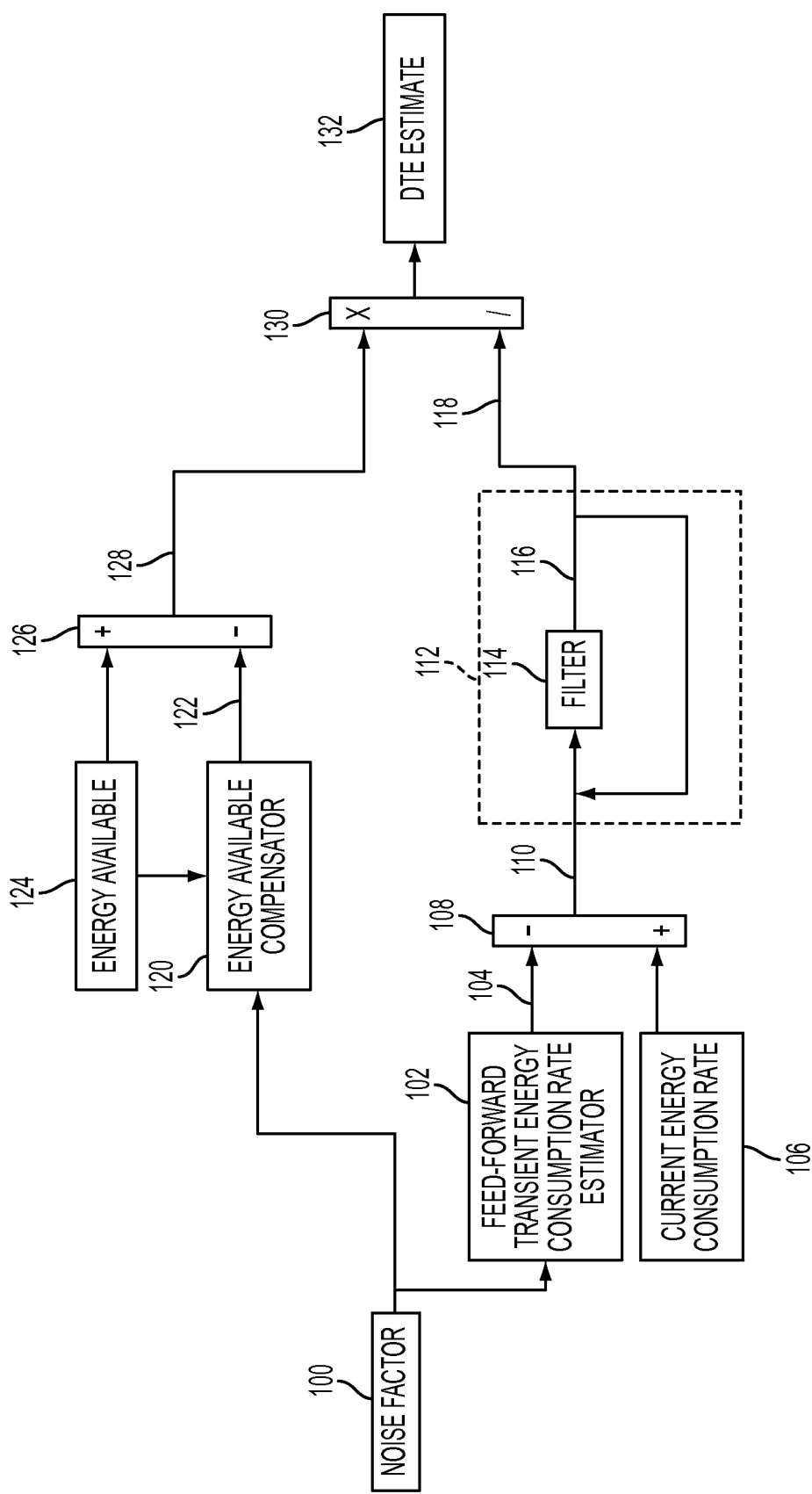
FIG. 2 is a schematic diagram of an exemplary distance to empty system.

Referring to FIG. 2, the controller 30 may be provided with a control algorithm configured to calculate or determine a distance to empty estimate that may compensate for the noise factors. The control algorithm may be executed by the controller 30 and may be implemented as a closed loop control system. The control algorithm may be provided with the feed-forward transient energy consumption rate estimator, the energy consumption rate learning algorithm, the energy available compensator, and the DTE calculator.

The control algorithm may monitor and receive a noise factor and/or a DTE estimate request at block 100. The noise factor may be a temperature associated with the vehicle, including but not limited to, an engine oil temperature, an engine coolant temperature, a heater core temperature, an evaporator core temperature, a vehicle cabin temperature, catalyst temperature, and a tire temperature or pressure. The control algorithm may monitor temperature associated with the vehicle, and if the temperature satisfies the four factors mentioned above, the temperature may be a transient temperature that may eventually achieve a steady state condition over a period of time, the control algorithm may continue to block 102.

The noise factor may be input to a feed-forward transient energy consumption rate estimator, block 102. The feed-forward transient energy consumption rate estimator, block 102, may output a transient change in energy consumption rate 104 due to the noise factor's impact on the overall vehicle's energy consumption rate. The feed-forward transient energy consumption rate estimator, block 102, may be provided with a transfer function model for each of the identified noise factors. The transfer function may receive the noise factor and output the expected energy consumption effect of the noise factor.

The transfer function may be a one-dimensional look-up table or multi-dimensional maps that predict the change in energy consumption rate effect of various noise factors. The feed-forward transient energy consumption rate estimator transfer function may predict the instantaneous effect of the noise factor on the energy consumption rate.

If the control algorithm identifies the noise factor as a part of the vehicle warm-up cycle, the energy consumption rate may be predicted to be higher than if the noise factor had achieved a steady state condition for a time period. This may be due to the fact that the instantaneous energy consumption rate during the vehicle warm-up cycle may include transient effects that make the instantaneous energy consumption rate higher than the steady-state energy consumption rate. The feed forward transient energy consumption rate estimator may subtract the predicted effect of the transient noise factor attempting to achieve a steady state condition. As the vehicle warms up, the energy consumption rate may be predicted to reach a steady state energy consumption rate.

For example, the transfer function may be based on a noise factor such as oil temperature. An oil temperature of −5 C may correspond to a transient change in energy consumption rate of 30 Whr/km, whereas a temperature of 0 C may correspond to 15 Whr/km. A temperature which represents the steady-state temperature threshold which may be 20 degrees C. would correspond to 0 Whr/km. For this example, the transfer function may be a one-dimensional look up table or oil viscosity curve as a function of temperature.

The transient change in energy consumption rate as the noise factor approaches a steady state condition may be determined by vehicle level characterization tests. The testing may monitor an ambient temperature and a noise factor temperature. The testing may monitor changes in the noise factor temperature at various vehicle operating points and determine the change in the energy consumption rate of the vehicle attributed to the noise factor approaching a steady state condition. A transfer function, algorithm, look-up table, calibrateable table or other means to relate a noise factor expected to achieve a steady state condition to the change in energy consumption rate as the noise factor approaches the steady state condition, determined by the characterization testing.

The transfer function may be based on multiple noise factors and be represented by a multi-dimensional look-up table or map such as cabin heating/cooling. The noise factors may include some combination of ambient temperature, current cabin temperature, desired or target vehicle cabin temperature and evaporator/heater core temperature.

The transient change in energy consumption rate 104, may represent the increase or decrease in energy consumption above a steady-state energy consumption rate. The increase or decrease in energy consumption may be due to the noise factor being outside of its associated steady-state condition or steady-state operating range. This may represent the net change in the energy consumption rate.

The current energy consumption rate may be calculated at block 106 using methods known to those of ordinary skill in the art and applied to calculation block 108. The transient change in energy consumption rate 104 may be applied to calculation block 108. A difference between the transient change in energy consumption rate 104 and the current energy consumption rate, block 106, may be output from calculation block 108, as a predicted current steady state energy consumption rate, 110.

The current steady state energy consumption rate estimate 110 may represent the steady state energy consumption rate if the noise factor has achieved steady state condition. The current steady state energy consumption rate estimate 110 may be input to the energy consumption rate learning algorithm block 112. A filter 114 may be applied to the current steady state energy consumption rate estimate 110 to provide a learned steady state energy consumption rate or a predicted current steady state energy consumption rate 116, subject to a time constant.

The predicted current steady state energy consumption rate 116 may be a filtered version of the difference between the current energy consumption rate from block 106 and the transient change in energy consumption rate 104. The learned steady state energy consumption rate is not an average energy consumption of the vehicle but a learned energy consumption rate. The algorithm removes the estimated transient energy consumption rate from the instantaneous consumption rate to produce the learned steady-state energy consumption rate. Therefore the filter 114 which depends on the past value of the filter and the current steady-state energy consumption rate estimate. The energy consumption rate learning algorithm block 112 ultimately outputs a learned or historical steady state energy consumption rate 118.

The noise factor may also be input to the energy available compensator, block 120. The energy available compensator, block 120, may be provided with a transfer function configured to estimate the cumulative amount of energy that may be consumed during the transient period prior to the noise factor achieving a steady state condition as a result of that noise factor. As the state of the system changes (e.g. warms up), the estimated energy will change correspondingly (e.g. decrease).

The transfer function may be based on multiple noise factors and represented by a multi-dimensional look-up table or map. The noise factors may include some combination of ambient temperature, current cabin temperature, desired or target vehicle cabin temperature and evaporator/heater core temperature.

The transfer functions of the energy available compensator, block 120, may also be one-dimensional curves or multi-dimensional maps. For example an oil temperature of −5 C may correspond to a transient energy loss estimate of 200 watt hours, whereas a temperature of 0 C may correspond to a transient energy loss estimate of 40 watt hours. A temperature which represents the steady-state temperature threshold which may be 20 degrees C. would correspond to 0 watt hours.

The energy available compensator, block 120, may output a transient energy loss estimate 122. The transient energy loss estimate 122 may represent the estimated integral of the transient change in energy consumption rate 104 over the remaining portion of the transient period. The transient energy loss estimate 122 may be limited based on an amount of energy available, block 124, in situations where the available energy might be depleted before the vehicle reaches steady-state. The transient energy loss estimate 122 and the amount of energy available from block 124 may be fed to the calculation block 126.

At calculation block 126, the transient energy loss estimate 122 may be subtracted from the amount of energy available from block 124. The calculation block 126 may provide a modified amount of energy available 128. The modified amount of energy available 128 and the learned or historical steady state energy consumption rate 118 may be input to the DTE calculator block 130.

At the DTE calculator block 130, the modified amount of energy available 128 may be divided by the historical steady state energy consumption rate 118 to provide a DTE estimate, block 132, or vehicle range estimate that accounts for the noise factors.

The transient noise factors may be robustly rejected by using the improved DTE estimator. The changes in the amount of energy available and energy consumption rates due to the transients may be compensated for, which may eliminate any overshoot caused by the extrapolating effect of the transient noise factors. The transients may be compensated for even in situations in which the vehicle is stopped.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A distance to empty (DTE) system for a vehicle comprising:
a controller programmed to, in response to a difference between current and expected steady state temperatures associated with the vehicle, output a DTE based on an amount of drive energy available and an energy loss factor that accounts for conversion of some of the drive energy to heat to raise the current temperature to the steady state temperature.

2. The system of claim 1, wherein the temperatures associated with the vehicle are transmission oil temperatures and wherein the expected steady state temperature is associated with a predetermined threshold transmission oil temperature.

3. The system of claim 1, wherein the temperatures associated with the vehicle are vehicle cabin temperatures and wherein the expected steady state temperature is associated with a threshold cabin temperature.

4. The system of claim 1, wherein the temperatures associated with the vehicle are heater core temperatures and wherein the expected steady state temperature is associated with a threshold heater core temperature.

5. The system of claim 1, wherein the DTE is further based on an energy consumption rate.

6. The system of claim 5, wherein the energy consumption rate is a learned energy consumption rate.

7. A vehicle comprising:
at least one tire; and
a controller programmed to, in response to a difference between current and expected steady state pressures of the at least one tire, output a distance to empty based on an amount of drive energy available and an energy loss factor that accounts for conversion of some of the drive energy to heat as the current pressure of the at least one tire increases to the steady state pressure.

8. The vehicle of claim 7, wherein the distance to empty is further based on an energy consumption rate.

9. The vehicle of claim 8, wherein the energy consumption rate is a learned energy consumption rate.

10. The vehicle of claim 7, wherein the steady state pressure is associated with a predetermined threshold pressure.

11. A method of estimating distance to empty (DTE) for a vehicle comprising:
in response to detecting an energy loss condition expected to be present during an initial portion of a drive cycle for a period of time needed for a current temperature or pressure associated with the vehicle to achieve a steady state, outputting a DTE based on an amount of drive energy available and an energy loss factor associated with the energy loss condition that accounts for conversion of some of the drive energy to heat as the current temperature or pressure increases to the steady state.

12. The method of claim 11, wherein the temperature associated with the vehicle is a transmission oil temperature and wherein the steady state is associated with a predetermined threshold transmission oil temperature.

13. The method of claim 11, wherein the temperature associated with the vehicle is a vehicle cabin temperature and wherein the steady state is associated with a threshold cabin temperature.

14. The method of claim 11, wherein the temperature associated with the vehicle is a heater core temperature and wherein the steady state is associated with a threshold heater core temperature.

15. The method of claim 11, wherein the pressure associated with the vehicle is a tire pressure and wherein the steady state is associated with a threshold tire pressure.

16. The method of claim 11, wherein the DTE is further based on an energy consumption rate.

17. The method of claim 16, wherein the energy consumption rate is a learned energy consumption rate.

* * * * *